US012057777B2

United States Patent
Xu

(10) Patent No.: US 12,057,777 B2
(45) Date of Patent: Aug. 6, 2024

(54) ASYMMETRIC HALF-BRIDGE FLYBACK CONVERTER AND CONTROL METHOD THEREOF

(71) Applicant: Joulwatt Technology Co., Ltd., Hangzhou (CN)

(72) Inventor: Xiangyong Xu, Hangzhou (CN)

(73) Assignee: JOULWATT TECHNOLOGY CO., LTD, Hangzhou (CN)

(*) Notice: Subject to any disclaimer, the term of this patent is extended or adjusted under 35 U.S.C. 154(b) by 219 days.

(21) Appl. No.: 17/852,325

(22) Filed: Jun. 28, 2022

(65) Prior Publication Data

US 2022/0416644 A1 Dec. 29, 2022

(30) Foreign Application Priority Data

Jun. 28, 2021 (CN) .......................... 202110718552.6

(51) Int. Cl.
*H02M 3/335* (2006.01)
*H02M 1/00* (2006.01)
(Continued)

(52) U.S. Cl.
CPC ..... *H02M 3/33571* (2021.05); *H02M 1/0009* (2021.05); *H02M 1/0058* (2021.05);
(Continued)

(58) Field of Classification Search
CPC .. H02M 1/0058; H02M 1/0009; H02M 1/083; H02M 1/38; H02M 3/33523;
(Continued)

(56) References Cited

U.S. PATENT DOCUMENTS 9,621,053 B1 * 4/2017 Telefus ............. H02M 3/33507
10,644,604 B2 * 5/2020 Wong ................ H02M 3/33592
(Continued)

FOREIGN PATENT DOCUMENTS

CN 105375783 A † 3/2016
CN 111697811 A 9/2020
(Continued)

*Primary Examiner* — Yusef A Ahmed
(74) *Attorney, Agent, or Firm* — Treasure IP Group, LLC

(57) ABSTRACT

Disclosed is an asymmetric half-bridge flyback converter and a control method, including: in an initial switching cycle of the asymmetric half-bridge flyback converter, obtaining a pre-turnoff time of the second switch transistor, and controlling the second switch transistor to be turned off after a delay which lasts for a first time and starts at the pre-turnoff time of the second switch transistor; in a non-initial switching cycle of the asymmetric half-bridge flyback converter, obtaining a judgment result by judging whether the first switch transistor is operated with zero-voltage switching in a current switching cycle, and adjusting a length of the first time based on the judgment result. The present disclosure can realize zero-voltage switching of the asymmetric half-bridge flyback converter, and at the same time, satisfy a requirement for achieving more ideal dead-time setting under a wider range of input voltage and a wider range of output voltage.

16 Claims, 9 Drawing Sheets

(51) Int. Cl.
  *H02M 1/08* (2006.01)
  *H02M 1/38* (2007.01)
(52) U.S. Cl.
  CPC ............. *H02M 1/083* (2013.01); *H02M 1/38* (2013.01); *H02M 3/33523* (2013.01); *H02M 3/33569* (2013.01)
(58) Field of Classification Search
  CPC ......... H02M 3/33569; H02M 3/33571; H02M 1/08; Y02B 70/10
  See application file for complete search history.

(56) References Cited

U.S. PATENT DOCUMENTS

| | | | | |
|---|---|---|---|---|
| 2006/0050539 | A1* | 3/2006 | Yang | H02M 3/33523 363/21.16 |
| 2010/0302822 | A1* | 12/2010 | Wang | H02M 3/33523 363/126 |
| 2011/0199793 | A1* | 8/2011 | Kuang | H05B 45/3725 363/21.13 |
| 2014/0092648 | A1* | 4/2014 | Tang | H02M 3/33515 363/21.17 |
| 2014/0160801 | A1* | 6/2014 | Stamm | H02M 3/33515 363/21.01 |
| 2014/0301116 | A1* | 10/2014 | Zhang | H02M 3/33523 363/21.15 |
| 2015/0271883 | A1* | 9/2015 | Kim | H05B 45/39 315/291 |
| 2016/0156259 | A1* | 6/2016 | Zhang | H02M 3/33523 363/21.12 |
| 2017/0149340 | A1* | 5/2017 | Ye | H02M 3/33507 |
| 2017/0212632 | A1* | 7/2017 | Shi | H02M 3/33523 |
| 2017/0264206 | A1* | 9/2017 | Rana | H02M 1/083 |
| 2017/0302185 | A1* | 10/2017 | Tao | H02M 3/33592 |
| 2020/0091826 | A1* | 3/2020 | Yang | H02M 3/33515 |
| 2021/0408921 | A1* | 12/2021 | Yang | H02M 1/38 |
| 2022/0038020 | A1* | 2/2022 | Guo | H02M 1/342 |
| 2022/0052613 | A1* | 2/2022 | Xu | H02M 1/15 |
| 2022/0069718 | A1* | 3/2022 | Xu | H02M 1/38 |
| 2022/0140743 | A1* | 5/2022 | Su | H02M 3/33592 363/21.06 |
| 2022/0216798 | A1* | 7/2022 | Liu | H02M 3/33592 |
| 2022/0271675 | A1* | 8/2022 | Yang | H02M 3/33523 |
| 2022/0271676 | A1* | 8/2022 | Yang | H02M 3/33592 |
| 2022/0329163 | A1* | 10/2022 | Yan | H02M 3/33523 |
| 2023/0129443 | A1* | 4/2023 | Liu | H02M 3/33571 363/21.12 |
| 2024/0088792 | A1* | 3/2024 | Kang | H02M 3/01 |

FOREIGN PATENT DOCUMENTS

| | | | |
|---|---|---|---|
| CN | 112350581 | A † | 2/2021 |
| CN | 112701882 | A † | 4/2021 |
| CN | 113300606 | A | 8/2021 |
| CN | 113726165 | A | 11/2021 |
| CN | 113726166 | A | 11/2021 |

\* cited by examiner
† cited by third party

- prior art -

- prior art -

# ASYMMETRIC HALF-BRIDGE FLYBACK CONVERTER AND CONTROL METHOD THEREOF

CROSS-REFERENCES TO RELATED APPLICATION

This application claims the priority of the Chinese patent application filed on Jun. 28, 2021, with the application number CN 202110718552.6 and the invention title "ASYMMETRIC HALF-BRIDGE FLYBACK CONVERTER AND CONTROL METHOD THEREOF", the entire contents of which are incorporated in this application by reference.

FIELD OF THE DISCLOSURE

The present disclosure relates to a technical field of an asymmetric half-bridge flyback converter, in particular to an asymmetric half-bridge flyback converter and a control method thereof.

DESCRIPTION OF THE RELATED ART

With rapid development of power electronics, switching converters are becoming more and more widely used, especially, people bring forward more requirements on the switching converters with high power density, high reliability, and small volume. In general, traditional low-power switching converters can be implemented based on flyback topology, which has advantages of simple structure and low cost. However, common flyback topology is configured to realize hard switching and is not able to recover leakage inductance energy, so that the efficiency and the size of a small and medium power converter are limited. In order to meet the development trend on power converters towards miniaturization, lightweight and modularization, soft switching technology has become one of the hot spots of power electronics technology. "Soft switching", which is referred to zero voltage switching (ZVS) or zero current switching, is realized based on the principle of resonance to make a voltage (or current) of a switch transistor of a switching converter change sinusoidally (or quasi-sinusoidally), and to turn on the device when the voltage crosses zero (or to turn off the device when the current naturally crosses zero), so as to realize zero switching loss, thus improving the efficiency and switching frequency of the converter and reducing the size of transformer and inductor. Soft switching technology is beneficial to realize miniaturization and modularization of power converters, however, due to many corresponding circuits, such as LLC, the circuit structure may become very complex, which increases the cost of medium and small power converters, and is often not conducive to commercial competition. An asymmetric half-bridge flyback converter (AHB) comprises two switches, which are arranged at a primary side of a transformer and can be provided in a half-bridge configuration and driven by different pulse width modulation (PWM) signals respectively corresponding to the two switches. An inductor of the asymmetric half-bridge flyback converter is divided to form a portion of the transformer, such that a voltage ratio can be multiplied based on a winding ratio of the transformer, with an additional advantage on isolation. At the same time, under a condition that the asymmetric half-bridge flyback converter has a similar number of devices and a similar complexity compared with the ordinary flyback converter, in the asymmetric half-bridge flyback converter, zero-voltage switching can be achieved on the two switches, the leakage inductance energy can be recovered, and self-driven synchronous rectification can be easily achieved, thus the efficiency can be effectively improved and at the same time, the volume of the transformer can be reduced, so that the asymmetric half-bridge flyback converter becomes a better application scheme.

Schematic circuit diagrams of conventional asymmetric half-bridge flyback converters are respectively shown in FIGS. 1a and 1b. In FIG. 1a, an upper switch transistor Q2 in FIG. 1a serves as a second switch transistor and a lower switch transistor Q1 serves as a first switch transistor. In FIG. 1b, an upper switch transistor Q1 serves as a first switch transistor and a lower switch transistor Q2 serves as a second switch transistor. The operating principles of the two circuits are basically the same, except that positions of the windings are different. Taking FIG. 1b as an example, an operating waveform diagram of the asymmetric half-bridge flyback converter operated under boundary conduction mode (BCM) is shown in FIG. 2, showing the waveforms of Vgs1 and Vgs2 which represent driving voltage signals of the first switch transistor Q1 and the second switch transistor Q2 respectively, $i_{Lm}$ which represents an excitation current on the primary winding Np, Vaux which is a voltage across the auxiliary winding Na, and Vds_Q1 which is a drain-source voltage of the first switch transistor. In order to prevent the first switch transistor Q1 and the second switch transistor Q2 from being shot through, a certain dead time (e.g., td1 and td2) is required in each of the driving voltage signals supplied to the first switch transistor Q1 and the second switch transistor Q2, respectively.

Referring to FIG. 2, in principle, the asymmetric half-bridge flyback converter under BCM mode is configured to control the second switch transistor Q2 to be turned on for an extra time (such as $t_{ZVS}$), generate a negative excitation current, and then realize zero-voltage switching on the first switch transistor Q1. However, performance of the existing scheme is not optimized when realizing the zero-voltage switching on the first switch transistor Q1, which is mainly reflected in following two aspects:

1. Adjustment to realize zero-voltage switching is not self-adaptive. Delay time $t_{ZVS}$, as shown in FIG. 2, is provided with a certain value through an open loop, thus accurate zero-voltage switching control cannot be realized.
2. A dead time td2, which begins after the second switch transistor Q2 is turned off and ends before the first switch transistor Q1 is turned on, is not optimized properly. The dead time td2 as shown in FIG. 2 needs to be adjusted according to an input voltage Vin and an output voltage Vo, which is complicated in design and not optimal in performance.

Therefore, it is necessary to provide an improved technical solution to overcome the above technical problems in the prior art.

SUMMARY OF THE DISCLOSURE

In order to solve the above technical problems, the present disclosure provides an asymmetric half-bridge flyback converter and a control method thereof, so that the zero-voltage switching of the asymmetric half-bridge flyback converter can be closer to an ideal state; at the same time, a more ideal dead-time setting can be satisfied under a wider range of input voltage and a wider range of output voltage.

According to a first aspect of the present disclosure, a control method of an asymmetric half-bridge flyback converter is provided. The asymmetric half-bridge flyback converter comprises a first switch transistor, a second switch transistor, an excitation inductor, a transformer, and a controller, the control method comprises:

in an initial switching cycle of the asymmetric half-bridge flyback converter, obtaining a pre-turnoff time of the second switch transistor, and controlling the second switch transistor to be turned off after a delay which lasts for a first time and starts at the pre-turnoff time of the second switch transistor;

in a non-initial switching cycle of the asymmetric half-bridge flyback converter, obtaining a judgment result by judging whether the first switch transistor is operated with zero-voltage switching in a current switching cycle, and adjusting a length of the first time based on the judgment result, In some embodiments, step of obtaining the pre-turnoff time of the second switch transistor comprises:

sampling and detecting a current on the excitation inductor, and obtaining the pre-turnoff time of the second switch transistor when a high-to-low zero-crossing time of the current on the excitation inductor is detected.

In some embodiments, step of obtaining the pre-turnoff time of the second switch transistor comprises:

obtaining a first integration result by performing time integration on a predetermined parameter of the asymmetric half-bridge flyback converter during a turn-on time period of the first switch transistor;

after the second switch transistor is turned on, obtaining a second integration result by performing time integration on the predetermined parameter of the asymmetric half-bridge flyback converter, and obtaining the pre-turnoff time of the second switch transistor when the second integration result is same as the first integration result, wherein, the predetermined parameter is a voltage across any one of windings in the transformer, comprising a primary winding, a secondary winding, and an auxiliary winding.

In some embodiments, the predetermined parameter is a voltage across the auxiliary winding.

In some embodiments, step of obtaining the pre-turnoff time of the second switch transistor comprises:

obtaining a first integration result by performing time integration on a predetermined parameter of the asymmetric half-bridge flyback converter during a turn-on time period of the first switch transistor;

after the second switch transistor is turned on, obtaining a second integration result by performing time integration on the predetermined parameter of the asymmetric half-bridge flyback converter, and obtaining the pre-turnoff time of the second switch transistor when the second integration result is same as the first integration result, wherein, the predetermined parameter is a current flowing through a voltage detection pin of a controller of the asymmetric half-bridge flyback converter; and the voltage detection pin of the controller is coupled to one end of an auxiliary winding of the transformer via a resistance element, and the other end of the auxiliary winding is coupled to a reference ground.

In some embodiments, step of judging whether the first switch transistor is operated with zero-voltage switching in the current switching cycle comprises:

obtaining a first sampled signal by sampling and holding a voltage across an auxiliary winding of the asymmetric half-bridge flyback converter during a turn-on time period of the first switch transistor in a previous switching cycle;

obtaining a second sampled signal by sampling the voltage across the auxiliary winding of the asymmetric half-bridge flyback converter at a time when the first switch transistor is turned on in the current switching cycle;

comparing the first sampled signal with the second sampled signal, determining that the first switch transistor is operated with zero-voltage switching in the current switching cycle if the second sampled signal is less than or equal to a product of the first sampled signal and k1, and determining that the first switch transistor is operated with hard switching in the current switching cycle if the second sampled signal is greater than the product of the first sampled signal and k1, wherein k1 is greater than 0 and less than or equal to 1.

In some embodiments, step of judging whether the first switch transistor is operated with zero-voltage switching in the current switching cycle comprises:

during a turn-on time period of the first switch transistor in a previous switching cycle, conducting a current path between a voltage detection pin of the controller and a reference ground, and obtaining a third sampled signal by sampling and holding a current flowing through the voltage detection pin;

conducting the current path between the voltage detection pin of the controller and the reference ground at a time when the first switch transistor is turned on in the current switching cycle, and sampling the current flowing through the voltage detection pin to obtain a fourth sampled signal;

comparing the third sampled signal with the fourth sampled signal, determining that the first switch transistor is operated with zero-voltage switching in the current switching cycle if the fourth sampled signal is less than or equal to a product of the third sampled signal and k2, and determining that the first switch transistor is operated with hard switching in the current switching cycle if the fourth sampled signal is greater than the product of the third sampled signal and k2, wherein k2 is greater than 0 and less than or equal to 1.

In some embodiments, step of judging whether the first switch transistor is operated with zero-voltage switching in the current switching cycle comprises:

detecting a changing rate of a voltage between two power terminals of the second switch transistor during a preset time, wherein the preset time is set as a time period before and after a time when the first switch transistor is turned on;

judging whether the changing rate is greater than a first threshold value, determining that the first switch transistor is operated with hard switching in the current switching cycle if the changing rate is greater than the first threshold value, and determining that the first switch transistor is operated with zero-voltage switching in the current switching cycle if the changing rate is not greater than the first threshold value.

In some embodiments, step of judging whether the first switch transistor is operated with zero-voltage switching in the current switching cycle comprises:

detecting a changing value of a voltage between two power terminals of the second switch transistor during a preset time, wherein the preset time is set as a time period before and after a time when the first switch transistor is turned on;

judging whether the changing value is greater than a second threshold value, determining that the first switch transistor is operated with hard switching in the current switching cycle if the changing value is greater than the second threshold value, determining that the first switch transistor is operated with zero-voltage switching if the changing value is not greater than the second threshold value.

In some embodiments, step of adjusting the length of the first time based on the judgment result comprises:
when it is determined that the first switch transistor is operated with zero-voltage switching in the current switching cycle, reducing the length of the first time with a first time step;
when it is determined that the first switch transistor is operated with hard switching in the current switching cycle, increasing the length of the first time with a second time step.

In some embodiments, step of controlling the second switch transistor to be turned off after a delay which lasts for the first time comprises:
receiving a first turn-off signal for controlling the second switch transistor to be turned off;
providing the first turn-off signal to a control terminal of the second switch transistor after the first turn-off signal is delayed by the first time.

In some embodiments, reducing the first time with the first time step comprises:
providing a turn-off signal, which is configured to control the second switch transistor to be turned off, to a control terminal of the second switch transistor after the turn-off signal is delayed by a first subtraction time, wherein, the first subtraction time is a differential time between the first time and the first time step.

In some embodiments, increasing the first time with the second time step comprises:
providing a turn-off signal, which is configured to control the second switch transistor to be turned off, to a control terminal of the second switch transistor after the turn-off signal is delayed by a first superposition time, wherein, the first superposition time is a sum of the first time and the second time step.

In some embodiments, in each switching cycle, after controlling the second switch transistor to be turned off, the control method further comprises:
controlling the first switch transistor to be turned on after a delay which lasts for a second time and starts at a zero-crossing detection time, wherein the zero-crossing detection time is a high-to-low zero-crossing time of a voltage across the auxiliary winding,
wherein the second time is equal to a product of a resonance cycle time of the asymmetric half-bridge flyback converter and x, wherein x is a selected one from a group of numbers comprising $1/5$, $9/40$, $1/4$, $7/24$, and $1/3$.

According to a second aspect of the present disclosure, an asymmetric half-bridge flyback converter is provided, and comprises: a transformer comprising a primary winding, a secondary winding, and an auxiliary winding;
a first switch transistor and a second switch transistor connected in series between an input voltage terminal and a reference ground;
an excitation inductor coupled between a drain of the second switch transistor and a homonymous end of the primary winding;
a first capacitor coupled between the reference ground and the non-homonymous end of the primary winding; and
a controller coupled with the first switch transistor, the second switch transistor and the auxiliary winding,
wherein, the controller comprises:
a first control unit, configured to, during an initial switching cycle of the asymmetric half-bridge flyback converter, obtain a pre-turnoff time of the second switch transistor according to a time integration performed on a predetermined parameter of the asymmetric half-bridge flyback converter during a turn-on time period of the first switch transistor and a turn-on time period of the second switch transistor, and generate a turn-off signal configured to control the second switch transistor to be turned off after a delay which lasts for a first time and starts at the pre-turnoff time;
a self-adaptive adjustment unit, configured to adaptively adjust a length of the first time according to a conduction condition of the second switch transistor in each non-initial switching cycle of the asymmetric half-bridge flyback converter.

In some embodiments, the self-adaptive adjustment unit comprises:
a sample-and-hold unit, configured to sample and hold a predetermined parameter of the asymmetric half-bridge flyback converter during a turn-on time period of the first switch transistor in a previous switching cycle, and obtain a first sampled signal;
a sampling unit, configured to sample the predetermined parameter of the asymmetric half-bridge flyback converter at a time when the first switch transistor is turned on in a current switching cycle and obtain a second sampled signal;
a comparator unit, coupled to the sample-and-hold unit and the sampling unit, respectively, configured to generate a first adjustment signal if the second sampled signal is less than or equal to a product of the first sampled signal and k1, or generate a second adjustment signal if the second sampled signal is greater than the product of the first sampled signal and k1,
wherein the first adjustment signal is configured to control the first time to be reduced, the second adjustment signal is configured to control the first time to be increased,
wherein k1 is greater than 0 and less than or equal to 1.

In some embodiments, the predetermined parameter is a voltage across any one of the windings in the transformer.

In some embodiments, the predetermined parameter is a voltage across the auxiliary winding, and the asymmetric half-bridge flyback converter further comprises:
a first resistor and a second resistor connected in series between a first end and a second end of the auxiliary winding, wherein an intermediate node between the first resistor and the second resistor is coupled to a voltage detection pin of the controller.

In some embodiments, the predetermined parameter is a current flowing through a voltage detection pin of the controller of the asymmetric half-bridge flyback converter, and the asymmetric half-bridge flyback converter further comprises:
a third resistor connected between the voltage detection pin of the controller and a first end of the auxiliary winding, wherein a second end of the auxiliary winding is coupled to the reference ground;
a third switch transistor connected between the voltage detection pin of the controller and the reference ground;
a third control unit, which is coupled to a control terminal of the third switch transistor, and configured to control the third switch transistor to be turned on during a turn-on time period of the first switch transistor and a turn-on time period of the second switch transistor.

In some embodiments, the controller further comprises:
a second control unit, configured to sample a voltage across the auxiliary winding in each switching cycle and generate a turn-on signal for controlling the first switch transistor to be turned on after a delay which lasts for a second time and starts at a high-to-low zero-crossing time of the voltage across the auxiliary winding,
wherein the second time is equal to a product of a resonance cycle time of the asymmetric half-bridge flyback converter and x, wherein x is a selected one from a group of numbers comprising $1/5$, $9/40$, $1/4$, $7/24$, and $1/3$.

The present disclosure has following beneficial effects:
1. Based on the judgment result obtained by judging whether the first switch is operated with zero-voltage switching at the beginning of a switching cycle, self-adaptive adjustment for zero-voltage switching on the first switch can be achieved, so that the asymmetric half-bridge flyback converter can be operated with zero-voltage switching closing to an ideal state. At the same time, a time integration is performed based on a predetermined parameter during a turn-on time period of the first switch transistor and a turn-on time period of the second switch transistor, thus the pre-turnoff time of the second switch transistor in the initial switching cycle can be determined more accurately, furthermore, a turn-off delay of the second switch transistor can be achieved on the basis of the pre-turnoff time, which can make it easier to realize zero-voltage switching on the first switch transistor in a switching cycle next to the initial switching cycle, and can also shorten the time required for adjusting the zero-voltage switching on the first switch transistor to approach ideal state.
2. A time interval between the ZCD (zero-crossing detection) time of the voltage across the auxiliary winding and the time when the first switch transistor is turned on serves as dead-time calculation time, and then a constant dead-time setting can be adopted to satisfy a requirement for achieving a more ideal dead-time setting under a wider range of input voltage and a wider range of output voltage.

It should be noted that the above general description and the following detailed description are only exemplary and explanatory descriptions and are not intended to limit the present invention.

BRIEF DESCRIPTION OF THE DRAWINGS

The above and other objects, features and advantages of the present invention will become more apparent from the description below with reference to the accompanying drawings.

DETAILED DESCRIPTION OF EMBODIMENTS OF THE DISCLOSURE

To facilitate understanding of the present disclosure, the present disclosure is more comprehensively described below with reference to the related accompanying drawings. Preferred embodiments of the present disclosure are shown in the accompanying drawings. However, the present invention may be embodied in different forms and is not limited to the embodiments described herein. Rather, these embodiments are described for providing a thorough and complete understanding of the present disclosure.

It should be noted that, in the present disclosure, the first switching cycle after an asymmetric half-bridge flyback converter is turned on is defined as an initial switching cycle of the asymmetric half-bridge flyback converter, and the second and subsequent switching cycles after the asymmetric half-bridge flyback converter is turned on is defined as non-initial switching cycles of the asymmetric half-bridge flyback converter.

Hereinafter the present invention will be described in detail with reference to the accompanying drawings.

In the present disclosure, the asymmetric half-bridge (AHB) flyback converter is operated under boundary conduction mode (BCM).

Figure 1A:
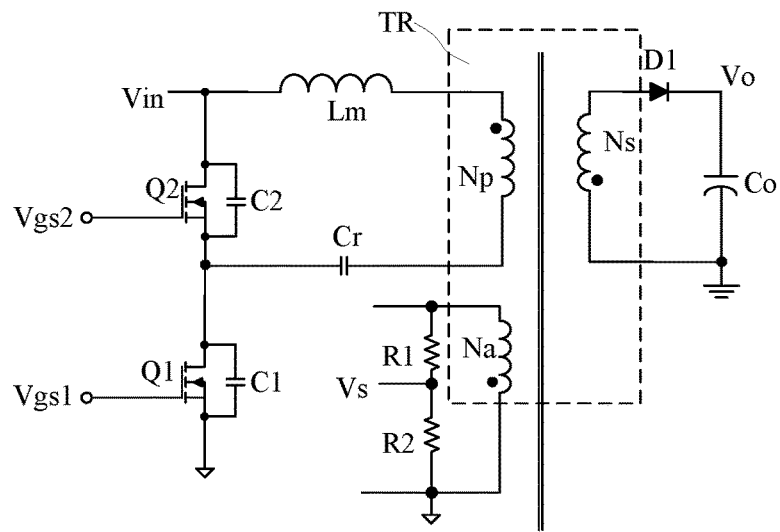
FIG. 1a shows a schematic diagram of a circuit structure of an asymmetric half-bridge flyback converter according to the prior art.
Figure 1B:
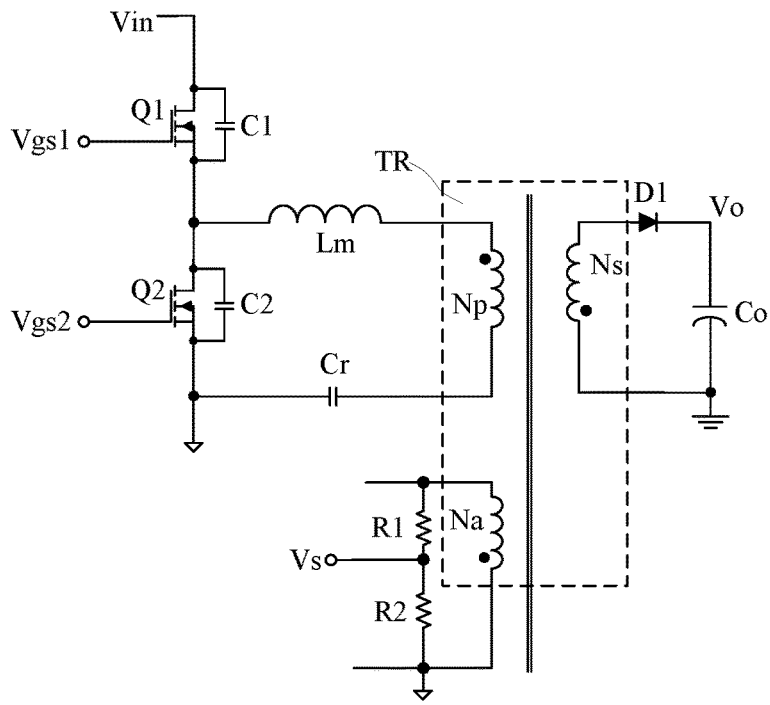
FIG. 1b shows a schematic diagram of another circuit structure of an asymmetric half-bridge flyback converter according to the prior art.
Figure 2:
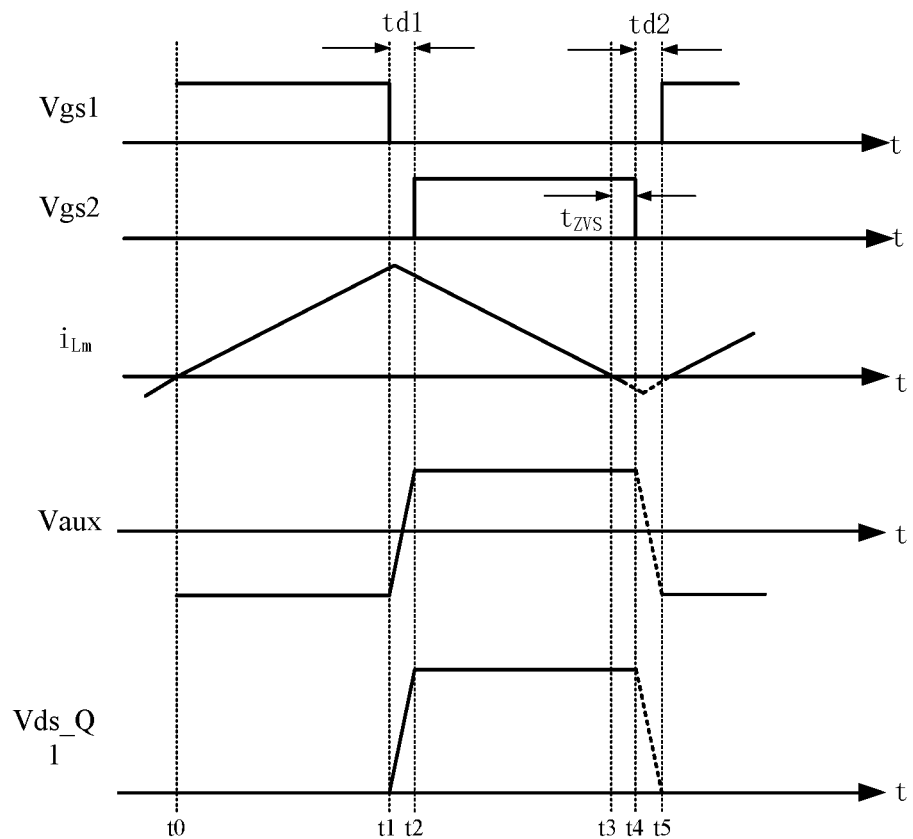
FIG. 2 shows a timing waveform diagram of an asymmetric half-bridge flyback converter under boundary conduction mode (BCM)
Figure 3:
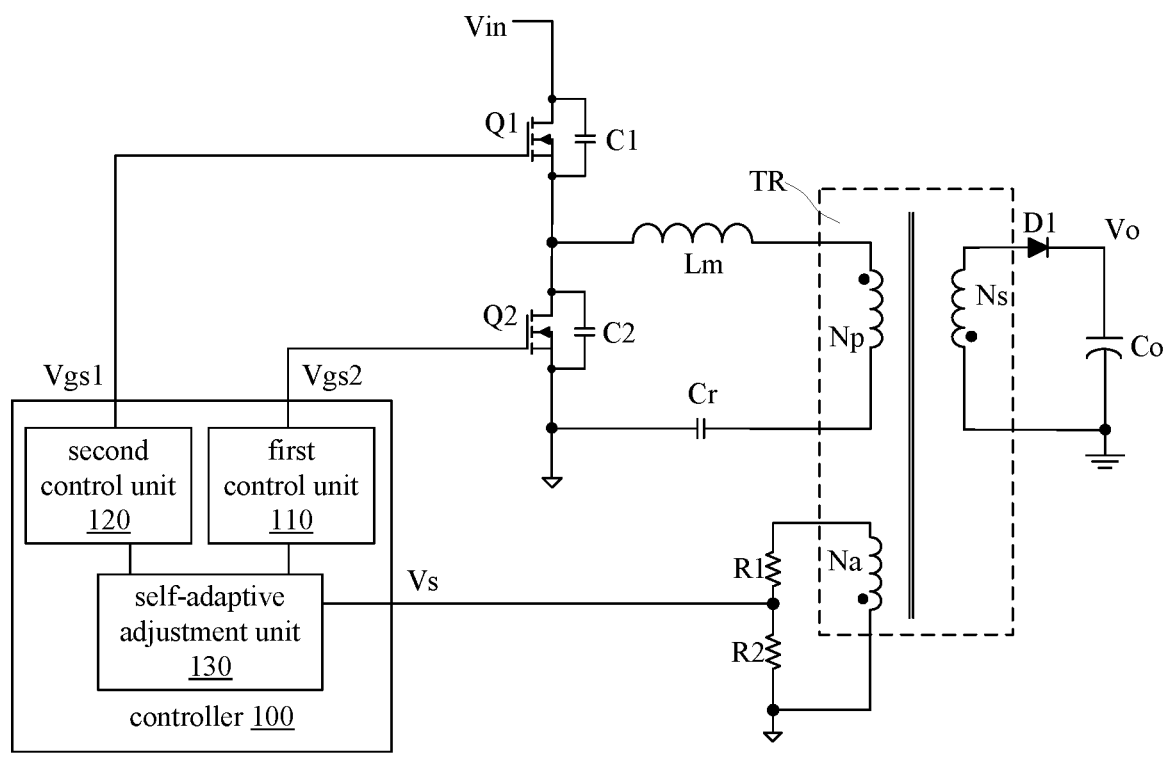
FIG. 3 shows a schematic diagram of a circuit structure of an asymmetric half-bridge flyback converter provided according to a first embodiment of the present disclosure.
Figure 4:
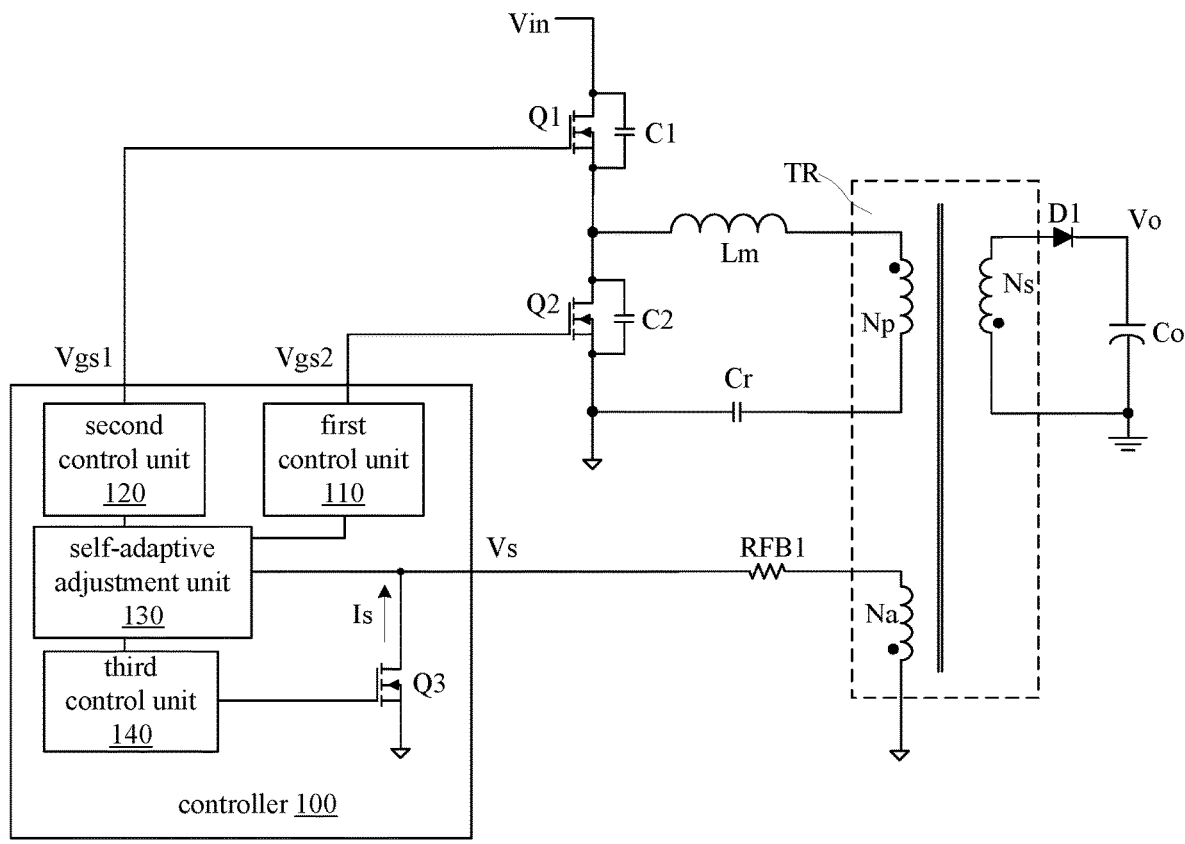
FIG. 4 shows a schematic diagram of a circuit structure of an asymmetric half-bridge flyback converter provided according to a second embodiment of the present disclosure.

As shown in FIGS. 3 and 4, in the present disclosure, the asymmetric half-bridge flyback converter comprises: a transformer TR, a first switch transistor Q1, a second switch transistor Q2, an excitation inductor Lm, a first capacitor Cr, and a controller 100. The transformer TR comprises a primary winding Np, a secondary winding Ns, and an auxiliary winding Na.

A drain electrode of the first switch transistor Q1 is connected to an input voltage terminal receiving an input voltage Vin, and a gate electrode of the first switch transistor Q1 is connected to the controller 100; a drain electrode of the second switch transistor Q2 is connected to a source electrode of the first switch transistor Q1, a source electrode of the second switch transistor Q2 is connected to a reference ground, a gate electrode of the second switch transistor Q2 is connected to the controller 100, and the capacitor C1 and the capacitor C2 represent junction capacitances of the first switch transistor Q1 and the second switch transistor Q2, respectively. During a same switching cycle, the first switch transistor Q1 and the second switch transistor Q2 are turned on in a time sharing manner, so that the input voltage can be transferred from a primary-side portion to a secondary-side portion of the transformer TR. In a possible embodiment, both the first switch transistor Q1 and the second switch transistor Q2 are NMOS field effect transistors.

One end of the excitation inductor Lm is connected to the drain electrode of the second switch transistor Q2, and the other end of the excitation inductor Lm is connected to a homonymous end of the primary winding Np; one end of the first capacitor Cr is connected to a non-homonymous end of the primary winding Np, and the other end of the first capacitor Cr is connected to the reference ground. In this embodiment, the first capacitor Cr is a resonant capacitor.

The secondary-side portion of the asymmetric half-bridge flyback converter comprises a rectifier diode D1 and an output capacitor Co. An anode of the rectifier diode D1 is connected with the non-homonymous end of the secondary winding Ns, and a cathode of the rectifier diode D1 is connected with an output terminal of the asymmetric half-bridge flyback converter; a positive electrode of the output capacitor Co is connected to the output terminal of the asymmetric half-bridge flyback converter, a negative electrode of the output capacitor Co is connected to the reference ground, and the homonymous end of the secondary winding Ns is also connected to the reference ground. Further, the output terminal of the asymmetric half-bridge flyback converter is connected to a load, wherein the load receives electric energy (e.g., voltage and current) converted by the asymmetric half-bridge flyback converter. In some instances, the electric energy converted by the asymmetric half-bridge flyback converter is also configured to pass through a filter before being provided to the load. In some examples, the filter may be a sub-component of the asymmetric half-bridge flyback converter, an external component of the asymmetric half-bridge flyback converter, and/or a sub-component of the load. Under any circumstances, the load may use filtered or unfiltered power, which is received from the asymmetric half-bridge flyback converter, to perform a corresponding function. Optionally, the load may include, but is not limited to, a computing device and a related component, such as a microprocessor, an electrical component, a circuit, a laptop computer, a desktop computer, a tablet computer, a mobile phone, a battery, a speaker, a lighting unit, an automobile/ship/aviation/train related component, a motor, a transformer, or any other type of electrical equipment and/or circuitry that may receive a voltage or current from the flyback converter.

The controller 100 comprises a first control unit 110, a second control unit 120, and a self-adaptive adjustment unit 130. The second control unit 120 is connected to the gate electrode of the first switch transistor Q1, the first control unit 110 is connected to the gate electrode of the second switch transistor Q2, and the self-adaptive adjustment unit 130 is connected to the auxiliary winding Na via a voltage detection pin Vs of the controller 100.

The first control unit 110 is configured to provide a first control signal Vgs2 to control the second switch transistor Q2 to be on/off. Specifically, in this embodiment, the first control unit 110 is configured to, during the initial switching cycle of the asymmetric half-bridge flyback converter, obtain a pre-turnoff time of the second switch transistor Q2 based on a time integration performed on a predetermined parameter of the asymmetric half-bridge flyback converter during a turn-on time period when the first switch transistor Q1 and a turn-on time period of the second switch transistor Q2, and generate a turn-off signal for controlling the second switch transistor Q2 to be turned off after a delay which lasts for a first time (referred to herein as $t_{ZVS}$) and starts at the pre-turnoff time. As an example, the turn-off signal may be a first control signal Vgs2 at low voltage level.

In an exemplary implementation, an integration circuit and a comparison circuit may be provided in the first control unit 110. In the initial switching cycle of asymmetric half-bridge flyback converter, the integration circuit is configured to perform time integration on the predetermined parameter of the asymmetric half-bridge flyback converter during a turn-on period of the first switch transistor Q1 and a turn-on time period of the second switch transistor Q2, respectively, so as to obtain corresponding first integration result and second integration result, in which case the first integration result and the second integration result may correspond to voltage signals output by the integration circuit. The comparison circuit is configured to compare the first integration result with the second integration result, trigger a timer or a delay unit to start timing at a time (i.e., a pre-turnoff time) when the second integration result is same as the first integration result, thereby triggering the first control unit 110 to generate a turn-off signal for controlling the second switch transistor Q2 to be turned off when a timing value obtained through timing reaches a time length corresponding to the first time $t_{ZVS}$. Alternatively, a current detection circuit may be provided in the first control unit 110. In the initial switching cycle of asymmetric half-bridge flyback converter, the current detection circuit is configured to sample and detect the excitation current $i_{Lm}$ on the excitation inductor Lm during a turn-on time period of the second switch transistor Q2, trigger a timer or a delay unit to start timing when a high-to-low zero-current time (i.e., a pre-turnoff time of the second switch transistor Q2) of the excitation current $i_{Lm}$ is detected, thereby triggering the first control unit 110 to generate a turn-off signal for controlling the second switch transistor Q2 to be turned off when the timing value obtained through timing reaches a time length corresponding to the first time $t_{ZVS}$.

In the present disclosure, the self-adaptive adjustment unit 130 is configured to adaptively adjust a length of the first time $t_{ZVS}$ according to a conduction condition of the second switch transistor Q2 during each non-initial switching cycle of the asymmetric half-bridge flyback converter.

Figure 5:
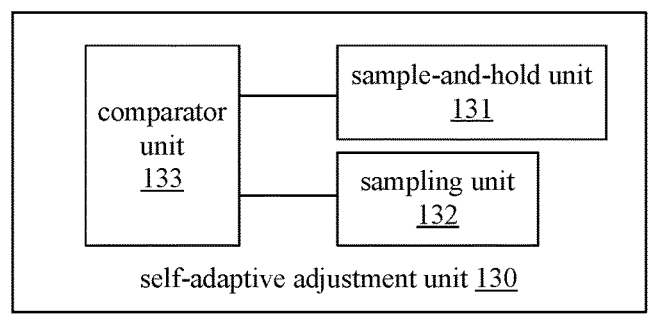
FIG. 5 shows a schematic structural diagram of a self-adaptive adjustment unit provided according to an embodiment of the present disclosure.

In some embodiments referring to FIG. 5 the self-adaptive adjustment unit 130 comprises a sample-and-hold unit 131 a sampling unit 132 and a comparator unit 133.

The sample-and-hold unit 131 is configured to sample and hold the predetermined parameter of the asymmetric half-bridge flyback converter during a turn-on time period of the first switch transistor Q1 in a previous switching cycle and obtain a first sampled signal. The sampling unit 132 is configured to sample the predetermined parameter of the asymmetric half-bridge flyback converter at a time when the first switch transistor Q1 is turned on in the current switching cycle and obtain a second sampled signal. The comparator unit 133 is connected to the sample-and-hold unit 131 and the sampling unit 132, respectively, for generating a first adjustment signal if the second sampled signal is less than or equal to a product of the first sampled signal and k1, or generating a second adjustment signal if the second sampled signal is greater than the product of the first sampled signal and k1. Wherein, the first adjustment signal is used to control the first time $t_{ZVS}$ to be decreased, the second adjustment signal is used to control the first time $t_{ZVS}$ to be increased, and k1 is greater than 0 and less than or equal to 1.

Based on an operating principle of the transformer TR, it can be known that a voltage across the primary winding Np, a voltage across the secondary winding Ns and a voltage Vaux across the auxiliary winding Na have a certain proportional relationship with each other. Further, in some embodiments, the predetermined parameter of the asymmetric half-bridge flyback converter is the voltage across any one of the windings comprised in the transformer TR, preferably, the voltage across the auxiliary winding Na is selected to serve as the predetermined parameter. As an example, the voltage across the auxiliary winding Na serves as the predetermined parameter. Under this circumstance, referring to FIG. 3, the asymmetric half-bridge flyback converter further comprises a first resistor R1 and a second resistor R2. The first resistor R1 and the second resistor R2 are sequentially connected in series between the non-homonymous end and the homonymous end of the auxiliary winding Na, and an intermediate node between the first resistor R1 and the second resistor R2 is connected to the voltage detection pin Vs of the controller 100.

Alternatively, in this embodiment, the voltage across the auxiliary winding Na may be sampled at the voltage detection pin Vs of the controller 100 after being divided by the first resistor R1 and the second resistor R2. In an alternative example, the voltage across the auxiliary winding Na may be directly sampled by the controller 100.

Figure 8:
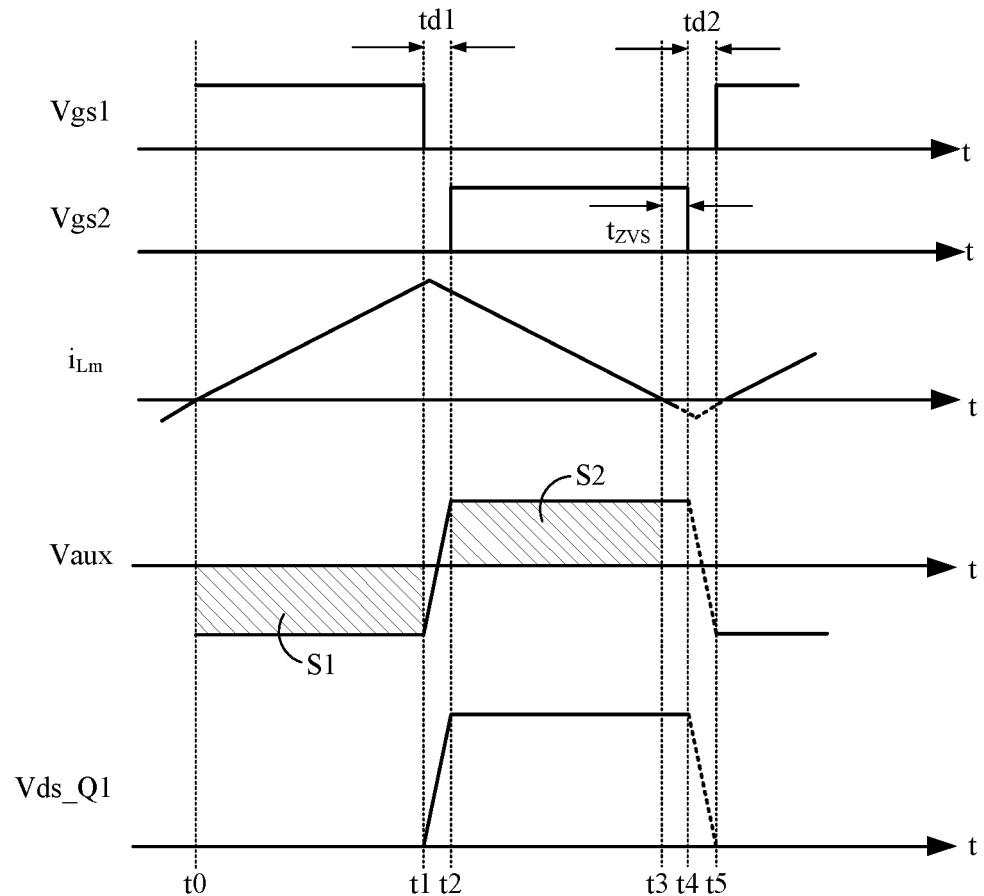
FIG. 8 shows a timing waveform diagram about determining an initial driving width of a second switch transistor in an asymmetric half-bridge flyback converter provided according to an embodiment of the present disclosure.

Referring to FIG. 8, the operating principle of the asymmetric half-bridge flyback converter during the initial switching cycle is described as follows:

At time t0, the second control signal Vgs1 is at high level and the first switch transistor Q1 is turned on. At this time, an integration circuit in the first control unit 110 starts to perform time integration on the voltage across the auxiliary winding Na.

During a time period from t0 to t1, the sample-and-hold unit 131 is configured to sample and hold the voltage across the auxiliary winding Na, denoted as Vaux_SH.

At time t1, the second control signal Vgs1 is changed to low level, the first switch transistor Q1 is turned off, the time integration performed on the voltage across the auxiliary winding Na by the integration circuit is stopped, and an integration result is latched and recorded as a first integration result.

At time t2, the first control signal Vgs2 is changed to high level and the second switch transistor Q2 is turned on. At this time, the integration circuit in the first control unit 110 starts to perform time integration on the voltage across the auxiliary winding Na again, records the corresponding integration result as a second integration result, and provides the second integration result to the comparison circuit in real time, so that the second integration result can be compared with the latched first integration result.

At time t3, the comparison circuit detects that the second integration result is same as the first integration result (that is, an area of shaded portion S2 in FIG. 8 is equal to an area of shaded portion S1), and the integration circuit stops performing time integration. At the same time, it can be determined that this time (t3) is the pre-turnoff time of the second switch transistor Q2, and a timing circuit is triggered to start timing at this time.

At time t4, timing value obtained by the timing circuit reaches a preset value, that is, a time length corresponding to the first time $t_{ZVS}$, the first control unit 110 is triggered to output the first control signal Vgs2 of low level to the gate electrode of the second switch transistor Q2, and the second switch transistor Q2 is controlled to be turned off.

At time t5, the second control unit 120 outputs a high-level second control signal Vgs1 to the gate electrode of the first switch transistor Q1, controls the first switch transistor Q1 to be turned on again, and further starts a next switching cycle of the asymmetric half-bridge flyback converter.

It can be understood that since the turn-on time period of the second switch transistor Q2 is prolonged, the excitation current $i_{Lm}$ continues to increase linearly in a negative direction after falling to zero at time t3. In a time period from t4 to t5, the junction capacitance C1 of the first switch transistor Q1 is discharged by the negative excitation current $i_{Lm}$, so that the first switch transistor Q1 can be turned on with zero voltage switching at time t5.

Figure 6:
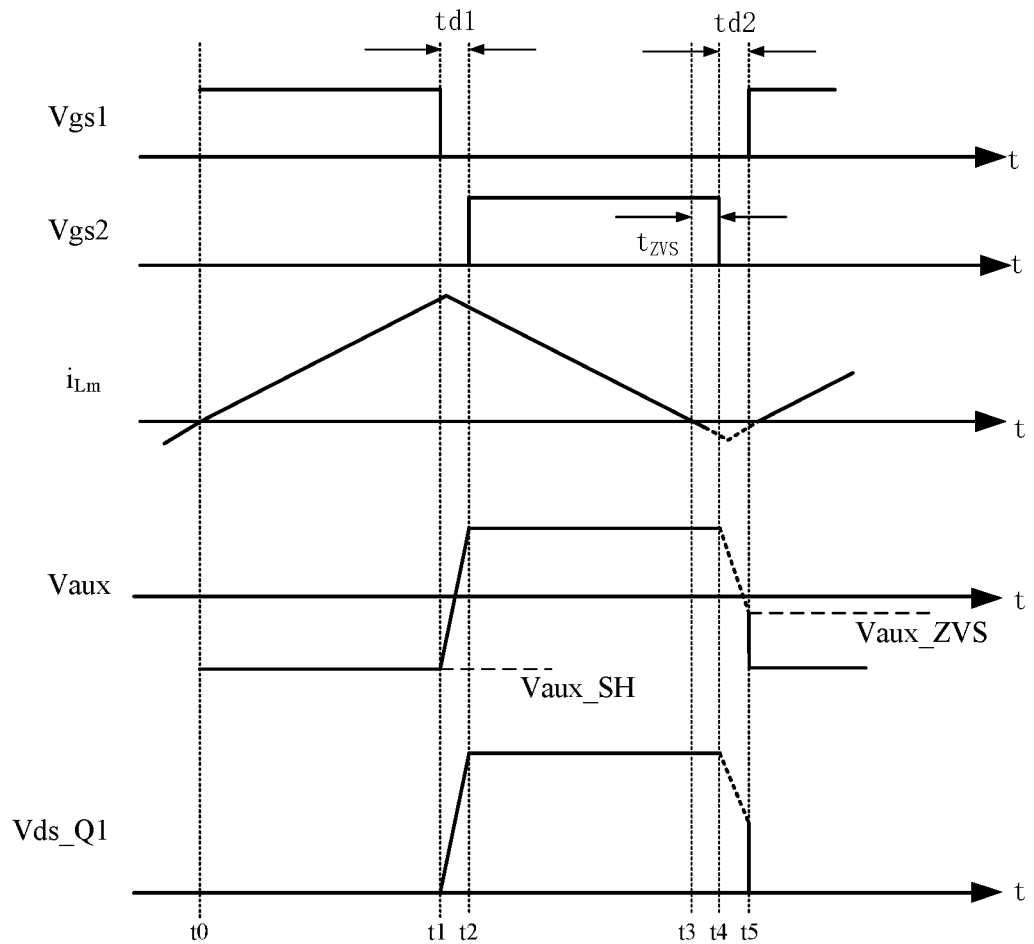
FIG. 6 shows a timing waveform diagram of an asymmetric half-bridge flyback converter operated with hard switching condition according to an embodiment of the present disclosure.

In this embodiment, referring to FIGS. 6 and 7, the operating principle of the asymmetric half-bridge flyback converter during each non-initial switching cycle is described as follows:

At time t0, the second control signal Vgs1 is changed to high level and the first switch transistor Q1 is turned on. At this time, the sampling unit 132 samples the voltage across the auxiliary winding Na to obtain a second sampled signal Vaux_ZVS, and outputs the second sampled signal Vaux_ZVS to the comparator unit 133. Thereafter, by the comparator unit 133, the second sampled signal Vaux_ZVS is compared with the first sampled signal Vaux_SH which is obtained in the previous switching cycle by the sample-and-hold unit 131.

Figure 7:
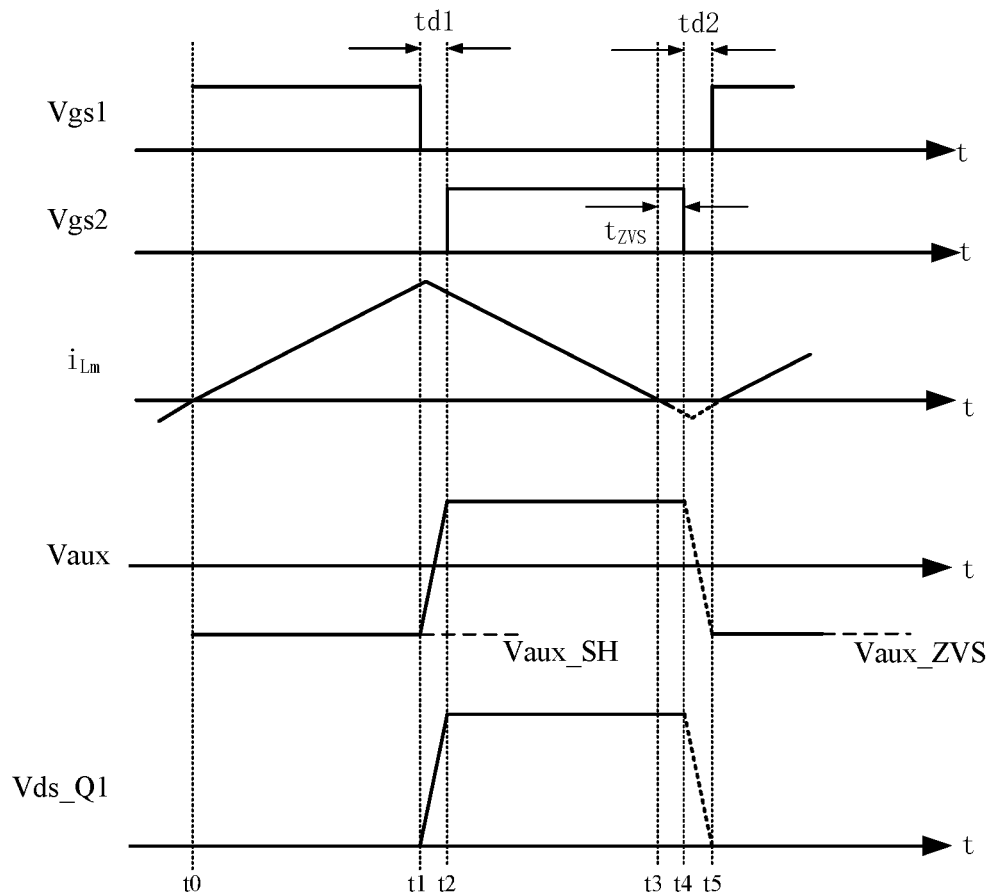
FIG. 7 shows a timing waveform diagram of an asymmetric half-bridge flyback converter operated with zero-voltage switching according to an embodiment of the present disclosure.

Further, by comparison, if the second sampled signal Vaux_ZVS is less than or equal to a product of the first sampled signal Vaux_SH and k1, referring to FIG. 7, it can be determined that the first switch transistor Q1 is operated with zero-voltage switching in the current switching cycle (referring to time t5 in FIG. 7, at which time the drain-source voltage Vds_Q1 of the first switch transistor Q1 is equal to 0). At this time, the comparator unit 133 generates a first adjustment signal to control the first time $t_{ZVS}$ determined in the previous switching cycle to be reduced with a first time step. If the second sampled signal Vaux_ZVS is greater than the product of the first sampled signal Vaux_SH and k1, referring to FIG. 6, it can be determined that the first switch transistor Q1 is operated with hard switching in the current switching cycle (referring to time t5 in FIG. 6, at which time the drain-source voltage Vds_Q1 of the first switch transistor Q1 is greater than 0). At this time, the comparator unit 133 generates a second adjustment signal to control the first time $t_{ZVS}$ determined in the previous switching cycle to be increased with a second time step.

Alternatively, a length of the first time step and a length of the second time step may be equal or not equal, the present invention is not limited thereto.

During a time period from t0 to t1, the second control signal Vgs1 is at high level, the first switch transistor Q1 is turned on, and the voltage across the auxiliary winding Na is negative. At this time, the sample-and-hold unit 131 is configured to sample and hold the voltage across the auxiliary winding Na, which is denoted as Vaux_SH.

During a time period from t2 to t3, the first control signal Vgs2 is changed to high level and the second switch transistor Q2 is turned on. Meanwhile, a pre-turnoff time t3 of the second switch transistor Q2 is determined based on the time t2.

At time t3, the timing circuit is triggered to start timing based on the adjusted first time $t_{ZVS}$.

At time t4, the timing value obtained by the timing circuit reaches a preset value, that is, a time length corresponding to the adjusted first time $t_{ZVS}$, and triggers the first control unit 110 to output the first control signal Vgs2 at low level to the gate electrode of the second switch transistor Q2 to control the second switch transistor Q2 to be turned off.

At time t5, the second control unit 120 outputs the second control signal Vgs1 at high level to the gate electrode of the first switch transistor Q1, controls the first switch transistor Q1 to be turned on again, and further starts a next switching cycle of the asymmetric half-bridge flyback converter.

Alternatively, during each non-initial switching cycle of the asymmetric half-bridge flyback converter, the pre-turnoff time t3 of the second switch transistor Q2 may be determined in the same manner as the time t3 determined in the initial switching cycle described above. Thus, the accuracy of the pre-turnoff time t3 of the second switch transistor Q2 determined in each switching cycle of the asymmetric half-bridge flyback converter can be ensured, and error accumulation caused by any change of a certain variate during the operation of the asymmetric half-bridge flyback converter can be avoided. On the other hand, it is also possible to obtain a first timing value through timing the duration of the time period from t2 to t3 in the initial switching cycle of the asymmetric half-bridge flyback converter, and then, start timing at time t2 in each non-initial switching cycle, stop timing at a time when the timing value obtained in each non-initial switching cycle reaches the first timing value and determine this time as the pre-turnoff time t3 of the second switch transistor Q2. In this way, the operation process of asymmetric half-bridge flyback converter can be simplified and the operating efficiency of the system can be improved.

In some other embodiments, the predetermined parameter is a current flowing through the voltage detection pin Vs of the controller 100. At this time, referring to FIG. 4, the asymmetric half-bridge flyback converter further comprises a third resistor RFB1, a third switch transistor Q3 and a third control unit 140. The third resistor RFB1 is connected between the voltage detection pin Vs of the controller 100 and the non-homonymous end of the auxiliary winding Na, and the homonymous end of the auxiliary winding Na is connected to the reference ground; the third switch transistor Q3 is connected between the voltage detection pin Vs of the controller 100 and the reference ground; the third control unit 140 is connected to a control terminal of the third switch transistor Q3 for controlling the third switch transistor Q3 to be turned on during a turn-on time period of the first switch transistor Q1 and a turn-on time period of the second switch transistor Q2.

Alternatively, in the present embodiment, the third switch transistor Q3 may be integrated inside the controller 100 or arranged outside the controller 100, which is not limited by the present invention. And in a possible embodiment, the third switch transistor Q3 can be an NMOS field effect transistor.

In this embodiment, the operating principle of the asymmetric half-bridge flyback converter during the initial switching cycle and each non-initial switching cycle is substantially the same as that described with respect to FIG. 8 in the preceding embodiments and will not be repeated here. A difference is that, in this embodiment, the object of time integration performed by the integration circuit and the object of sampling performed by the sample-and-hold unit 131 and the sampling unit 132 are the current Is flowing through the voltage detection pin Vs of the controller 100 during a turn-on time period of the first switch transistor Q1 and a turn-on time period of the second switch transistor Q2. Meanwhile, at time t0 and time t2, the third control unit 140 is configured to output a third control signal Vgs3 at high level to the gate electrode of the third switch transistor Q3 to control the third switch transistor Q3 to be turned on.

Alternatively, in other embodiments, the self-adaptive adjustment unit is further configured to compare a changing rate dV/dt of the voltage Vds_Q2 between two power terminals of the second switch transistor with a first threshold value, or compare a changing value of the voltage Vds_Q2 between the two power terminals of the second switch transistor with a second threshold value, so as to obtain a judgment result by judging whether the first switch transistor Q1 is operated with zero voltage switching in the current switching cycle, and then dynamically adjust the length of the first time in a next switching cycle according to the judgment result, so as to make the zero-voltage switching at a turn-on time of the first switch transistor Q1 more idealized. Further, when the changing rate dV/dt of the voltage Vds_Q2 between the two power terminals of the second switch transistor is greater than the first threshold value, or the changing value of the voltage Vds_Q2 between the two power terminals of the second switch transistor is greater than the second threshold value, it can be determined that the first switch transistor Q1 is operated with hard switching in the current switching cycle, otherwise, it can be determined that the first switch transistor Q1 is operated with zero-voltage switching in the current switching cycle.

In the embodiment, self-adaptive adjustment on zero-voltage switching performed on the first switch transistor can be realized by judging whether the first switch transistor is operated with zero-voltage switching at the beginning of a switching cycle, so that the asymmetric half-bridge flyback converter can be operated with zero-voltage switching closing to an ideal state. At the same time, by performing time integration based on a predetermined parameter during a turn-on time period of the first switch transistor and a turn-on time period of the second switch transistor, the pre-turnoff time of the second switch transistor in the initial switching cycle can be determined more accurately, furthermore, turn-off delay can be performed on the second switch transistor on the basis of the pre-turnoff time, which can make it easier to realize zero-voltage switching on the first switch transistor in the next switching cycle of the initial switching cycle, and can also shorten the time required for adjusting the zero-voltage switching on the first switch transistor to approach ideal state.

In the present embodiment, the second control unit 120 is configured to sample the voltage across the auxiliary winding Na in each switching cycle, and generate a turn-on signal for controlling the first switch transistor Q1 to be turned on after a delay which lasts for a second time and starts at the high-to-low zero-crossing time of the voltage across the auxiliary winding Na. That is, the second control signal Vgs1 at high level is output to the gate electrode of the first switch transistor Q1. The second time is equal to a product of the resonance cycle time of the asymmetric half-bridge flyback converter and x, wherein x may be, but not limited to, a selected one from a group of numbers comprising ⅕, 9/40, ¼, 7/24, ⅓, and x may also be any real value in a range from ⅕ to ⅓, preferably, x is ¼.

In each switching cycle of the asymmetric half-bridge flyback converter, a first dead time (denoted as td1) is set after the first switch transistor Q1 is turned off and before the second switch transistor Q2 is turned on, and a second dead time (denoted as td2) is set after the second switch transistor Q2 is turned off and before the first switch transistor Q1 is turned on, in order to prevent the first switch transistor Q1 and the second switch Q1 from turning on at the same time.

Figure 9:
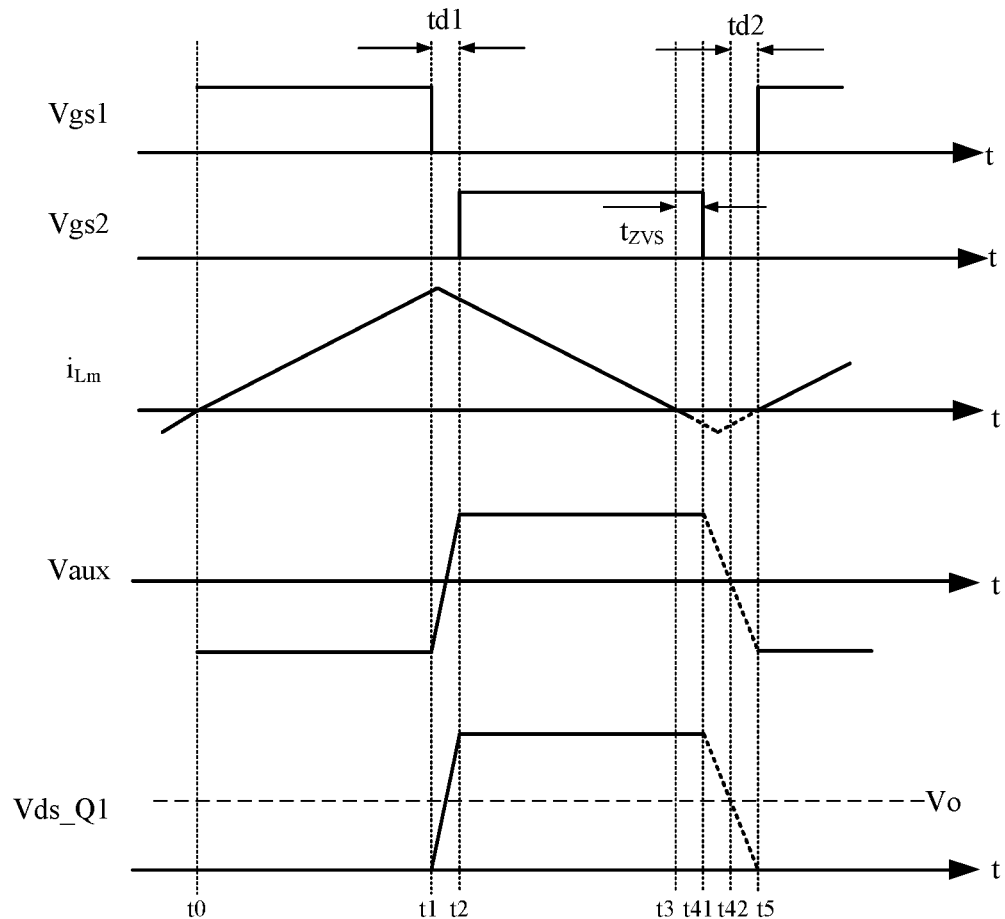
FIG. 9 shows a timing waveform diagram about determining a dead time in an asymmetric half-bridge flyback converter provided according to an embodiment of the present disclosure.

Referring to FIG. 9, the operating principle of the asymmetric half-bridge flyback converter during each switching cycle is described as follows:

During the time period from t0 to t1, the second control signal Vgs1 is at high level, and the first switch transistor Q1 is turned on. During this period, the energy at the input voltage terminal for receiving the input voltage Vin excites the transformer TR through a loop comprising the first switch transistor Q1, the excitation inductor Lm, the primary winding Np and the first capacitor Cr, and the excitation current $i_{Lm}$ first decreases linearly from negative to zero and then increases linearly. In this process, the excitation inductor Lm, the transformer TR, and the first capacitor Cr store energy while the secondary rectifier diode D1 is turned off reversely.

At time t1 the second control signal Vgs1 is changed to low level and the first switch transistor Q1 is turned off.

During the time period from t1 to t2, the first switch transistor Q1 is in an off state and the second switch transistor Q2 has not been turned on, and the time period from t1 to t2 is referred as dead time td1. During dead time d1, because freewheeling current is required by the excitation inductor Lm and the primary winding Np, resonance oscillation may take place based on the junction capacitance C1 of the first switch transistor Q1, the junction capacitance C2 of the second switch transistor Q2, the first capacitor Cr, the excitation inductor Lm and the primary winding Np, and the energy of the junction capacitance C2 of the second switch transistor Q2 is extracted, so that the drain-source voltage Vds_Q2 of the second switch transistor Q2 decreases, and at the same time the junction capacitance C1 of the first switch transistor Q1 is charged, and the drain-source voltage Vds_Q1 of the first switch transistor Q1 increases. During the same time period, the voltage Vaux on the auxiliary winding Na rises from a negative value.

At time t2, a voltage across the junction capacitance C1 of the first switch transistor Q1 reaches a highest value, and a voltage across the junction capacitance C2 voltage of the second switch transistor Q2 is discharged to zero voltage. At this time, the first control signal Vgs_Q2 is changed to high level and the second switch transistor Q2 is turned on, so that zero-voltage switching can be realized on the second switch transistor Q2. At the same time, the voltage Vaux on the auxiliary winding Na also reaches a highest value.

During the time period from t2 to t3, the rectifier diode D1 is forwardly conductive at the secondary side of the asymmetric half-bridge flyback converter, the energy stored at the primary side of the transformer TR begins to be released to the secondary side, and the excitation current $i_{Lm}$ linearly decreases.

At time t3, which is detected, by the controller 100, as the pre-turnoff time of the asymmetric half-bridge flyback converter, timing is started. Meanwhile, at time t3, the excitation current $i_{Lm}$ linearly drops to zero current.

During the time period from t3 to t41, by use of the timing circuit, timing is continued, the excitation inductor Lm is resonated with the first capacitor Cr, the energy stored on the first capacitor Cr is also released to the secondary side through forward excitation process, and the excitation current $i_{Lm}$ goes into a state with negative direction.

At time t41, the timing value obtained by the timing circuit in the asymmetric half-bridge flyback converter reaches a value corresponding to the adjusted first time $t_{ZVS}$, and the timing circuit stops timing. At this time, the first control signal Vgs_Q2 received by the gate electrode of the second switch transistor Q2 is changed to low level, and the second switch transistor Q2 is turned off.

During a time period from t41 to t42, the first switch transistor Q1 and the second switch transistor Q2 are both in off state, the excitation current $i_{Lm}$ serves as a freewheeling current flowing through the excitation inductor Lm and the primary winding Np, therefore, resonance oscillation can take place based on the junction capacitance C1 of the first switch transistor Q1, the junction capacitance C2 of the second switch transistor Q2, the first capacitor Cr, the excitation inductor Lm and the primary winding Np, and the energy of the junction capacitance C1 of the first switch transistor Q1 can be extracted, so that the drain-source voltage Vds_Q1 of the first switch transistor Q1 decreases and the junction capacitance C2 of the second switch transistor Q2 is charged at the same time, and the drain-source voltage Vds_Q1 of the second switch transistor Q2 increases. At the same time, the voltage Vaux across the auxiliary winding Na also decreases linearly.

At time t42, the voltage Vaux across the auxiliary winding Na drops to zero, and it is determined that this time is the zero-crossing detection (ZCD) time. And the timing circuit in the asymmetric half-bridge flyback converter starts timing from this time.

At time t5, the timing value obtained by the timing circuit reaches a value corresponding to the preset second time td2, and the timing circuit stops timing. At this time, the voltage across the junction capacitance C2 of the second switch transistor Q2 reaches a highest value, the voltage across the junction capacitance C1 of the first switch transistor Q1 is discharged to a zero voltage, and the second control signal Vgs_Q1 is changed to high level, thus the first switch transistor Q1 can be turned on with zero-voltage switching. Thus, a cycle is completed, and then operations can be continuously repeated according to the same operating process.

In this embodiment, a time interval between the ZCD (zero-crossing detection) time of the voltage across the auxiliary winding and the time when the first switch transistor is turned on is regarded as a second dead-time calculation time, and a constant second dead-time setting can be adopted, thus satisfying a requirement for achieving more ideal dead-time setting under a wider range of input voltage and a wider range of output voltage.

Figure 10:
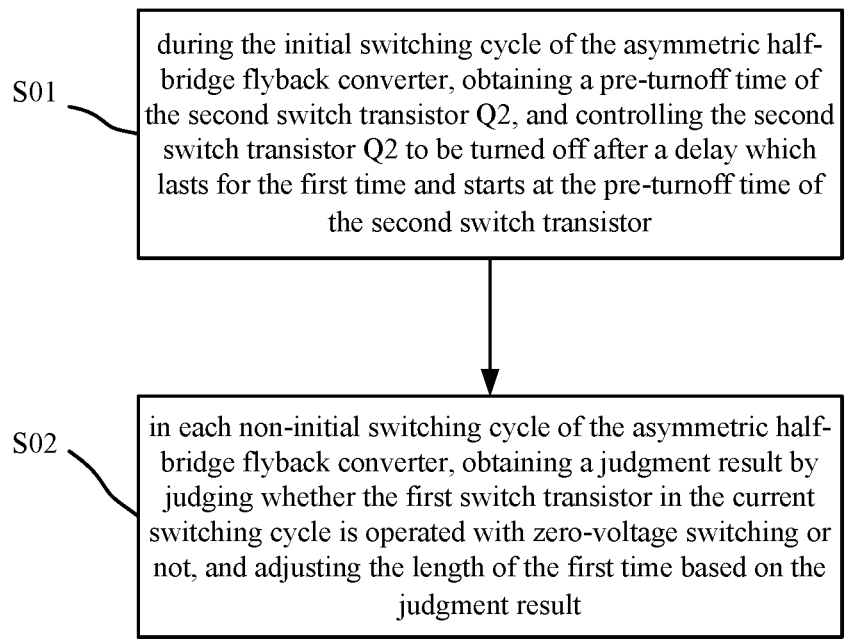
FIG. 10 shows a flowchart of a control method of an asymmetric half-bridge flyback converter provided according to an embodiment of the present disclosure.

FIG. 10 shows a flowchart of a control method of an asymmetric half-bridge flyback converter provided according to an embodiment of the present disclosure. Referring to FIG. 10, the control method can be used in the asymmetric half-bridge flyback converter described previously in FIGS. 3 to 9.

As shown in FIG. 10, in the present disclosure the control method of the flyback converter comprises performing steps S01 to S02.

Specifically, in step S01, during the initial switching cycle of the asymmetric half-bridge flyback converter, a pre-turnoff time of the second switch transistor Q2 is obtained, and the second switch transistor Q2 is controlled to be turned off after a delay which lasts for the first time $t_{ZVS}$ and starts at the pre-turnoff time of the second switch transistor Q2.

In this embodiment, step of obtaining the pre-turnoff time of the second switch transistor comprises: sampling and detecting a current $i_{Lm}$ on the excitation inductor Lm, and obtaining the pre-turnoff time of the second switch transistor Q2 when a high-to-low zero current time of the current $i_{Lm}$ on the excitation inductor is detected. Alternatively, the step of obtaining the pre-turnoff time of the second switch transistor comprises: obtaining a first integration result by performing time integration on a predetermined parameter of the asymmetric half-bridge flyback converter during a turn-on time period of the first switch transistor Q1; after the second switch transistor Q2 is turned on, obtaining a second integration result by performing time integration on the predetermined parameter of the asymmetric half-bridge flyback converter, and obtaining the pre-turnoff time of the second switch transistor Q2 when the second integration result is same as the first integration result.

Further, in some embodiments, the predetermined parameter of the asymmetric half-bridge flyback converter is the voltage across any one of the windings in the transformer TR, preferably the voltage across the auxiliary winding Na. As an example, the predetermined parameter is the voltage Vaux across the auxiliary winding Na, and specific workflow for obtaining the pre-turnoff time of the second switch transistor Q2 based on the voltage Vaux across the auxiliary winding Na can be referred to aforementioned description according to FIG. 8 and will not be repeated here.

In some other embodiments, the predetermined parameter of the asymmetric half-bridge flyback converter is a current Is flowing through the voltage detection pin Vs of the controller 100 of the asymmetric half-bridge flyback converter. Specific workflow for obtaining the pre-turnoff time of the second switch transistor Q2 based on the current Is of the voltage detection pin Vs of the controller 100 can be referred to the foregoing description according to FIG. 8, just by equivalently replacing the objective of the time integration into the current Is flowing through the voltage detection pin Vs of the controller 100 during the turn-on time period of the first switch transistor Q1 and the turn-on time period of the second switch transistor Q2 for understanding, which will not be described here.

Further, step of controlling the second switch transistor Q2 to be turned off after a delay which lasts for the first time $t_{ZVS}$ and starts at the first turn-off time includes: receiving a first turn-off signal for controlling the second switch transistor Q2 to be turn off; providing the first turn-off signal to the control terminal of the second switch transistor Q2 after a delay which lasts for the first time $t_{ZVS}$ and starts at the first turn-off signal.

In step S02, in each non-initial switching cycle of the asymmetric half-bridge flyback converter, a judgment result is obtained by judging whether the first switch transistor in the current switching cycle is operated with zero-voltage switching or not, and the length of the first time is adjusted based on the judgment result.

In some embodiments, step of judging whether the first switch transistor Q1 is operated with zero-voltage switching in the current switching cycle comprises: obtaining a first sampled signal Vaux_SH by sampling and holding a voltage Vaux across the auxiliary winding of the asymmetric half-bridge flyback converter during a turn-on time period of the first switch transistor Q1 in a previous switching cycle; obtaining a second sampled signal Vaux_ZVS by sampling the voltage Vaux across the auxiliary winding of the asymmetric half-bridge flyback converter at a time when the first switch transistor Q1 is turned on in the current switching cycle; comparing the first sampled signal Vaux_SH with the second sampled signal Vaux_ZVS, determining that the first switch transistor Q1 is operated with zero-voltage switching in the current switching cycle if the second sampled signal Vaux_ZVS is less than or equal to a product of the first sampled signal Vaux_SH and k1, and determining that the first switch transistor Q1 is operated with hard switching in the current switching cycle if the second sampled signal Vaux_ZVS is greater than the product of the first sampled signal Vaux_SH and k1, where k1 may be greater than 0 and less than or equal to 1. Specific workflow of judging whether the first switch transistor Q1 is turned on with zero voltage switching in the current switching cycle based on the voltage Vaux across the auxiliary winding Na can refer to the aforementioned description according to FIGS. 6 and 7, and will not be repeated here.

In other embodiments, step of judging whether the first switch transistor Q1 is operated with zero-voltage switching in the current switching cycle comprises: during a turn-on time period of the first switch transistor Q1 in a previous switching cycle, conducting a current path between a voltage detection pin Vs of the controller 100 and a reference ground, and obtaining a third sampled signal by sampling and holding a current Is flowing through the voltage detection pin Vs; conducting the current path between the voltage detection pin Vs of the controller and the reference ground at a time when the first switch transistor Q1 is turned on in the current switching cycle, and sampling the current Is flowing through the voltage detection pin Vs to obtain a fourth sampled signal; comparing the third sampled signal with the fourth sampled signal, determining that the first switch transistor Q1 is operated with zero-voltage switching in the current switching cycle if the fourth sampled signal is less than or equal to a product of the third sampled signal and k2, and determining that the first switch transistor Q1 is operated with hard switching in the current switching cycle if the fourth sampled signal is greater than the product of the third sampled signal and k2, where k2 is greater than 0 and less than or equal to 1. Specific workflow of judging whether the first switch transistor Q1 is turned on with zero voltage switching in the current switching cycle based on the voltage Vaux across the auxiliary winding Na can refer to the aforementioned description according to FIGS. 6 and 7, just by equivalently replacing the object sampled by the sample-and-hold circuit 131 and the sample circuit 132 into the current Is flowing through the voltage detection pin Vs of the controller 100 during the turn-on time period of the first switch transistor Q1 and the turn-on time period of the second switch transistor Q2 for understanding, which will not be described here.

Optionally, the values of k1 and k2 can be the same or different, and can be reasonably selected according to actual situation, the present invention is not limited to this.

In some other embodiments, step of judging whether the first switch transistor Q1 is operated with zero-voltage switching in the current switching cycle comprises: detecting a changing rate of a voltage Vds_Q2 between two power terminals of the second switch transistor Q2 during a preset time, wherein the preset time is set as a time period before and after a time when the first switch transistor Q1 is turned on; judging whether the changing rate is greater than a first threshold value, determining that the first switch transistor Q1 is operated with hard switching in the current switching cycle if the changing rate is greater than the first threshold value, and determining that the first switch transistor Q1 is operated with zero-voltage switching in the current switching cycle if the changing rate is not greater than the first threshold value.

Alternatively, step of judging whether the first switch transistor is operated with zero-voltage switching in the current switching cycle comprises: detecting a changing value of a voltage Vds_Q2 between two power terminals of the second switch transistor during a preset time, wherein the preset time is set as a time period before and after a time when the first switch transistor Q1 is turned on; judging whether the changing value is greater than a second threshold value, determining that the first switch transistor Q1 is operated with hard switching in the current switching cycle if the changing value is greater than the second threshold value, determining that the first switch transistor Q1 is operated with zero-voltage switching if the changing value is not greater than the second threshold value.

Further, in some embodiments, step of adjusting the length of the first time $t_{ZVS}$ based on the judgment result comprises: when it is determined that the first switch transistor Q1 is operated with zero-voltage switching in the current switching cycle, reducing the length of the first time $t_{ZVS}$ with a first time step; when it is determined that the first switch transistor Q1 is operated with hard switching in the current switching cycle, increasing the length of the first time $t_{ZVS}$ with a second time step.

Step of reducing the first time $t_{ZVS}$ with the first time step comprises: providing a turn-off signal, which is configured to control the second switch transistor Q2 to be turned off, to a control terminal of the second switch transistor Q2 after the turn-off signal is delayed by a first subtraction time, wherein, the first subtraction time is a differential time between the first time $t_{ZVS}$ and the first time step.

Step of increasing the first time $t_{ZVS}$ with the second time step comprises: providing a turn-off signal, which is configured to control the second switch transistor Q2 to be turned off, to a control terminal of the second switch transistor Q2 after the turn-off signal is delayed by a first superposition time, wherein, the first superposition time is a sum of the first time $t_{ZVS}$ and the second time step.

Further, in the present disclosure, in each switching cycle, after controlling the second switch transistor Q2 to be turned off, the control method further comprises: controlling the first switch transistor to be turned on after a delay which lasts for a second time and starts at a zero-crossing detection time, wherein the zero-crossing detection time is a high-to-low zero-crossing time of a voltage across an auxiliary winding in the transformer, wherein the second time is equal to a product of a resonance cycle time of the asymmetric half-bridge flyback converter and x, wherein x may be, but not limited to, a selected one from a group of numbers comprising ⅕, 9/40, ¼, 7/24, ⅓. A specific method can be referred to aforementioned description according to FIG. 9 and will not be repeated here.

To sum up, according to the present disclosure, the asymmetric half-bridge flyback converter may be operated with zero-voltage switching closing to an ideal state; at the same time, a requirement for achieving a more ideal dead-time setting under a wider range of input voltage and a wider range of output voltage can be satisfied.

Finally, it should be noted that: obviously, the above-mentioned embodiments are only examples for clearly illustrating the present invention, and are not intended to limit the implementations. A person with ordinary skill in the art may further make other changes or variations in a different form on the basis of the above description. Herein, examples are unnecessarily provided for all implementation manners. However, the obvious changes or modifications derived from this are still within the protection scope of the present invention.

What is claimed is:

1. A control method of an asymmetric half-bridge flyback converter comprising a transformer, a controller and a half bridge formed by a first switch transistor and a second switch transistor, wherein the control method comprises:

in an initial switching cycle of the asymmetric half-bridge fly back converter, obtaining a pre-turnoff time of the second switch transistor, and controlling the second switch transistor to be turned off after a delay which lasts for a first time and starts at the pre-turnoff time of the second switch transistor;

in a non-initial switching cycle of the asymmetric half-bridge flyback converter, obtaining a judgment result by judging whether the first switch transistor is opera ted with zero-voltage switching in a current switching cycle, and adjusting a length of the first time based on the judgment result;

obtaining a first integration result by performing time integration on a predetermined parameter of the asymmetric half-bridge flyback converter during a turn-on time period of the first switch transistor;

after the second switch transistor is turned on, obtaining a second integration result by performing time integration on the predetermined parameter of the asymmetric half-bridge flyback converter, and obtaining the pre-turnoff time of the second switch transistor when the second integration result is same as the first integration result;

wherein the transformer comprises a primary winding, a secondary winding or an auxiliary winding, wherein, in each switching cycle, after controlling the second switch transistor to be turned off, the control method further comprises:

controlling the first switch transistor to be turned on after a delay which lasts for a second time and starts at a zero-crossing detection time, wherein the zero-crossing detection time is a high-to-low zero-crossing time of a voltage across an auxiliary winding in the transformer, wherein the second time is equal to a product of a resonance cycle time of the asymmetric half-bridge flyback converter and x, wherein x is is greater than 0 and less than 1.

2. The control method according to claim 1, wherein the asymmetric half-bridge flyback converter comprises an excitation inductor, and step of obtaining the pre-turnoff time of the second switch transistor comprises:

sampling and detecting a current on the excitation inductor, and obtaining the pre-turnoff time of the second switch transistor when a high-to-low zero current time of the current on the excitation inductor is detected.

3. The control method according to claim 1, wherein the predetermined parameter is a voltage across any one of the primary winding, the secondary winding or the auxiliary winding.

4. The control method according to claim 3, wherein predetermined parameter is a voltage across the auxiliary winding.

5. The control method according to claim 1, wherein the predetermined parameter is a current flowing through a voltage detection pin of the controller of the asymmetric half-bridge flyback converter; and the voltage detection pin of the controller is connected with one end of the auxiliary winding via a resistance element, and the other end of the auxiliary winding is connected with a reference ground.

6. The control method according to claim 1, wherein step of judging whether the first switch transistor is opera ted with zero-voltage switching in the current switching cycle comprises:

obtaining a first sampled signal by sampling and holding a voltage across the auxiliary winding of the asymmetric half-bridge flyback converter during a turn-on time period of the first switch transistor in a previous switching cycle;

obtaining a second sampled signal by sampling the voltage across the auxiliary winding of the asymmetric half-bridge flyback converter at a time when the first switch transistor is turned on in the current switching cycle;

comparing the first sampled signal with the second sampled signal, determining that the first switch transistor is operated with zero-voltage switching in the current switching cycle if the second sampled signal is less than or equal to a product of the first sampled signal and k1, and determining that the first switch transistor is operated with hard switching in the current switching cycle if the second sampled signal is greater than the product of the first sampled signal and k1, wherein k1 is greater than 0 and less than or equal to 1.

7. The control method according to claim 6, wherein step of adjusting the length of the first time based on the judgment result comprises:

when it is determined that the first switch transistor is operated with zero-voltage switching in the current switching cycle, reducing the length of the first time with a first time step;

when it is determined that the first switch transistor is operated with hard switching in the current switching cycle, increasing the length of the first time with a second time step.

8. The control method according to claim 1, wherein step of judging whether the first switch transistor is opera ted with zero-voltage switching in the current switching cycle comprises:

during a turn-on time period of the first switch transistor in a previous switching cycle, conducting a current path between a voltage detection pin of the controller and a reference ground, and obtaining a third sampled signal by sampling and holding a current flowing through the voltage detection pin;

conducting the current path between the voltage detection pin of the controller and the reference ground at a time when the first switch transistor turned on in the current switching cycle, and obtaining a fourth sampled signal by sampling the current flowing through the voltage detection pin;

comparing the third sampled signal with the fourth sampled signal, determining that the first switch transistor is operated with zero-voltage switching in the current switching cycle if the fourth sampled signal is less than or equal to a product of the third sampled signal and k2, and determining that the first switch transistor is operated with hard switching in the current switching cycle if the fourth sampled signal is greater than the product of the third sampled signal and k2, wherein k2 is greater than 0 and less than or equal to 1.

9. The control method according to claim 1, wherein step of judging whether the first switch transistor is operated with zero-voltage switching in the current switching cycle comprises:

detecting a changing rate of a voltage between two power terminals of the second switch transistor during a preset time, wherein the preset time is set as a time period before and after a time when the first switch transistor is turned on;

judging whether the changing rate is greater than a first threshold value, determining that the first switch transistor is operated with hard switching in the current switching cycle if the changing rate is greater than the first threshold value, and determining that the first switch transistor is opera ted with zero-voltage switching in the current switching cycle if the changing rate is not greater than the first threshold value.

10. The control method according to claim 1, wherein step of judging whether the first switch transistor is operated with zero-voltage switching in the current switching cycle comprises:

detecting a changing value of a voltage between two power terminals of the second switch transistor in a preset time, wherein the preset time is set as a time period before and after a time when the first switch transistor is turned on;

judging whether the changing value is greater than a second threshold value, determining that the first switch transistor is operated with hard switching in the current switching cycle if the changing value is greater than the second threshold value, determining that the first switch transistor is operated with zero-voltage switching if the changing value is not greater than the second threshold value.

11. The control method according to claim 1, wherein x is selected from $\frac{1}{5}$, $\frac{9}{40}$, $\frac{1}{4}$, $\frac{7}{24}$, and $\frac{1}{3}$.

12. An asymmetric half-bridge flyback converter, comprising:

a transformer, comprising a primary winding, a secondary winding and an auxiliary winding;

a first switch transistor and a second switch transistor connected in series between an input voltage terminal and a reference ground;

a controller connected with the first switch transistor, the second switch transistor and the auxiliary winding, respectively, wherein, the controller comprises:

a first control unit, configured to, during a n initial switching cycle of the asymmetric half-bridge flyback converter, obtain a pre-turnoff time of the second switch transistor according to a time integration performed on a predetermined parameter of the asymmetric half-bridge flyback converter during a turn-on time period of the first switch transistor and a turn-on time period of the second switch transistor, and generate a turn-off signal configured to control the second switch transistor to be turned off after a delay which lasts for a first time and starts at the pre-turnoff time;

a self-adaptive adjustment unit, configured to adaptively adjust a length of the first time according to a conduction condition of the second switch transistor in each non-initial switching cycle of the asymmetric half-bridge flyback converter, wherein the self-adaptive adjustment unit comprises:

a sample-and-hold unit, configured to sample and hold a predetermined parameter of the asymmetric half-bridge flyback converter during a turn-on time period of the first switch transistor in a previous switching cycle, and obtain a first sampled signal;

a sampling unit, configured to sample the predetermined parameter of the asymmetric half-bridge flyback converter at a time when the first switch transistor is turned on in a current switching cycle and obtain a second sampled signal;

a comparator unit, connected to the sample-and-hold unit and the sampling unit, respectively, and configured to generate a first adjustment signal if the second sampled signal is less than or equal to a product of the first sampled signal and k1, or generate a second adjustment signal if the second sampled signal is greater than the product of the first sampled signal and k1, wherein the first adjustment signal is configured to control the first time to be reduced, and the second adjustment signal is configured to control the first time to be increased, wherein k1 is greater than 0 and less than or equal to 1, wherein the asymmetric half-bridge flyback converter further comprises:

a third resistor connected between a voltage detection pin of the controller and a first end of the auxiliary winding, wherein the second end of the auxiliary winding is connected to the reference ground;

a third switch transistor connected between the voltage detection pin of the controller and the reference ground;

a third control unit, which is coupled to a control terminal of the third switch transistor, and configured to control the third switch transistor to be turned on during a turn-on time period of the first switch transistor and a turn-on time period of the second switch transistor.

13. The asymmetric half-bridge flyback converter according to claim 12, wherein the predetermined parameter is a voltage across any one of the primary winding, the secondary winding and the auxiliary winding in the transformer.

14. The asymmetric half-bridge flyback converter according to claim 13, wherein the predetermined parameter is a voltage across the auxiliary winding, and the asymmetric half-bridge flyback converter further comprises:

a first resistor and a second resistor connected in series between a first end and a second end of the auxiliary winding, and an intermediate node between the first resistor and the second resistor is coupled to the voltage detection pin of the controller.

15. The asymmetric half-bridge flyback converter according to claim 12, wherein the predetermined parameter is a current flowing through the voltage detection pin of the controller of the asymmetric half-bridge flyback converter.

16. The asymmetric half-bridge flyback converter according to claim 12, wherein the controller further comprises:

a second control unit configured to sample a voltage across the auxiliary winding in each switching cycle and generate a turn-on signal for controlling the first switch transistor to be turned on after a delay which lasts for a second time and starts at a high-to-low zero-crossing time of the voltage across the auxiliary winding, wherein the second time is equal to a product of a resonance cycle time of the asymmetric half-bridge flyback converter and x, wherein x is a selected one from a group of numbers comprising $1/5$, $9/40$, $1/4$, $7/24$, and $1/3$.

* * * * *